United States Patent Office 3,502,734
Patented Mar. 24, 1970

3,502,734
PROCESS FOR PARTIALLY CHLORINATING METHYL CHLORIDE AND/OR METHYLENE CHLORIDE
Robert M. Baird, Valparaiso, Ind., Peter K. Baumgarten, Wilmington, Del., and Joseph A. Gentilucci, Lewiston, N.Y., assignors to E. I. du Pont de Nemours and Company, Wilmington, Del., a corporation of Delaware
No Drawing. Filed May 11, 1966, Ser. No. 549,185
Int. Cl. C07c 17/00
U.S. Cl. 260—658                10 Claims

ABSTRACT OF THE DISCLOSURE

Process for partially chlorinating methyl chloride and/or methylene chloride in which (a) the pressure is maintained above the critical pressure of the reaction mixture; (b) the ingredients, in specified proportions, are preheated to a specified temperature range; and (c) the reaction is allowed to proceed adiabatically in such a way as to capitalize upon the high heat capacity of the reaction mixture at temperatures close to its critical temperature; whereby high yields of methylene chloride and/or chloroform are obtained in a safe manner and with minimum formation of by-product carbon tetrachloride.

BACKGROUND OF THE INVENTION

The Hass et al. Patent U.S. 2,105,733, describes various prior art processes for chlorinating saturated hydrocarbons and their partially chlorinated derivatives. The patent itself is mainly directed to processes wherein elemental chlorine is reacted with the hydrocarbon or its derivative, wherein the pressure is maintained between about 10 and 150 atmospheres, and wherein the temperature is maintained between about 100° C. and 350° C. Under these conditions, it is disclosed that the reaction takes place "either in liquid phase or in a highly compressed vapor phase." When a volatile starting material such as methane is to be chlorinated, the patent suggests dissolving it in a solvent such as carbon tetrachloride prior to chlorination. In the only example which discloses the production of a chloromethane compound, methane is dissolved in carbon tetrachloride and is then reacted with 3 to 4 mols of chlorine for each mol of methane, at a temperature of about 240° to 250° C. and at a pressure of 70 atmospheres to produce principally carbon tetrachloride. The reaction is carried out in a tube immersed in a liquid heat exchange medium which serves to control the reaction temperature at an essentialy constant level.

Chlorination reactions of this type are so highly exothermic that they tend to produce decompositions or even explosions. Hass et al. undoubtedly were utilizing both the carbon tetrachloride reaction medium and the liquid heat exchange medium as means for preventing uncontrolled reactions. This large concentration of carbon tetrachloride, however, reduces the effective concentration of the material to be chlorinated and thus tends to reduce the productivity of the system. Furthermore. Hass et al. were not specifically concerned with techniques for maximizing the yield of methylene chloride and/or chloroform while minimizing the yield of carbon tetrachloride.

DESCRIPTION OF THE INVENTION

It has now been discovered that the process of partially chlorinating methyl chloride, methylene chloride or combinations thereof can be operated in a safe and highly effective manner if one controls certain key variables in such a way as to capitalize upon the high heat capacity which the reaction mixture exhibits under certain combined conditions of pressure and temperature. These conditions involve the reaction mixture being under a pressure in excess of its critical pressure, and at a temperature which is within a certain range relative to its critical temperature, all as defined more fully hereinafter. As a result of the high heat capacity exhibited by the reaction mixture under these particular conditions, the reaction can be carried out adiabatically, yet much of the exothermic heat of reaction can be absorbed internally. A large portion of the reaction thus occurs at the relatively lower temperatures which favor the formation of methylene chloride and/or chloroform, and the reaction mixture never reaches the high temperature levels which favor the formation of carbon tetrachloride, or the even higher temperature levels which cause decompositions or explosions. At the same time, the temperature can be allowed to rise in a controlled manner to a high enough final level so that the overall reaction is rapid and the chlorine is essentially completely consumed.

Accordingly, the partial chlorination process of the present invention comprises providing a feed mixture which initially consists essentially of chlorine plus a partially chlorinated methane starting material selected from the group consisting of methyl chloride, methylene chloride and combinations thereof, the mol ratio of chlorine to partially chlorinated methane in said mixture being in the range of about 1:3 to about 1:12, the pressure on said mixture being at least 65 atmospheres, and the pre-heat temperature of said mixture being in the range of about 120° C. to about 230° C. but not beyond the temperature range within which the reaction mixture exhibits a heat capacity of at least 30 pound-centrigrade units per pound-mol per ° C.; causing the chlorination reaction to proceed under substantially adiabatic conditions and at a pressure of at least 65 atmospheres; the combination of (a) the composition of the partially chlorinated methane starting material plus (b) the mol ratio of chlorine to partially chlorinated methane plus (c) the pre-heat temperature being such that the exothermic heat of reaction causes the temperature to rise adiabatically at least 20° C. and through a temperature range in which the mixture exhibits a heat capacity of at least 30 pound-centrigrade units per pound-mol per ° C., and up to a maximum reaction temperature which is not higher than about 450° C., at which maximum temperature essentially all of the chlorine has been reacted; and thereupon separating out a partially chlorinated methane product which contains a higher proportion of combined chlorine than the partially chlorinated methane starting material and which is selected from the group consisting of methylene chloride, chloroform and combinations thereof.

The starting material may consist predominately of methyl chloride or methylene chloride or a combination thereof. If the desired product is methylene chloride, then the starting material is predominately methyl chloride. Methylene chloride is removed as the product, and the methyl chloride that is recycled contains only the relatively small amounts of methylene chloride which cannot conveniently be removed from the crude product. If the desired product is chloroform or a mixture thereof with methylene chloride, then the starting material may be either methyl chloride or methylene chloride or a combination thereof. Since methyl chloride is the most conveniently obtained starting material, it is desirable to operate in such a manner that part of the methyl chloride is initially converted to chloroform and part is converted to methylene chloride, with part or all of the methylene chloride being recycled for further chlorination. Since the introduction of each additional chlorine atom liberates about 24 kilocalories per mol, the overall heat load per run can be decreased if part of the methyl chloride is chlorinated only to methylene chloride, and/or part of the chloroform is formed from methylene chloride. The starting material may also contain relatively smaller amounts of other compounds such as chloroform, carbon tetrachloride, hydrogen chloride and/or inert ingredients. It is desirable to minimize the concentration of water, oxygen, free radical inhibitors, metallic salts that may be catalytic, and other such foreign materials in the system in order to avoid the formation of corrosive or otherwise undesirable by-products.

In a preferred embodiment, the starting material for a given run is a mixture containing at least 30% by weight of methyl chloride, at least 30% by weight of methylene chloride, and no more than 10% by weight of chloroform. Such a starting material is particularly useful for producing methylene chloride and chloroform simultaneously, without introducing an excessive heat load on the system and without introducing difficult product recovery or distillation problems.

In order to maintain the proper heat balance in the reaction system, it is important that the mol ratio of chlorine to partially chlorinated methane in the feed mixture be within the range of about 1:3 to about 1:12, and preferably in the range of about 1:4 to about 1:7. If the amount of chlorine employed exceeds the amount represented by the 1:3 ratio, the quantity of heat liberated is apt to be so great that the final reaction temperature can exceed 450° C., in which case an excessive amount of carbon tetrachloride is usually formed, or else one encounters decomposition with the accompanying formation of undesired carbon, or else the mixture becomes explosive. If the amount of chlorine employed is less than the amount represented by the 1:12 ratio, the reaction is either undesirably slow or else an unduly large amount of external heat must be supplied. In view of the heat characteristics of the reaction, mol ratios in the range of about 1:4 to about 1:7 are preferred, particularly when the starting material is a mixture of methyl chloride and methylene chloride.

As noted above, an important feature of the invention involves carrying out the process in such a way as to take advantage of the high heat capacity which the reaction mixtures exhibit under the conditions specified. Those conditions, in turn, involve two important properties, namely, the critical temperature of the reaction mixture and its critical pressure.

Considering first a pure compound as distinguished from a mixture, the critical temperature of a compound is the temperature above which it cannot be converted from the gaseous state into the liquid state, no matter how much pressure is applied; and its critical pressure is the pressure required to liquefy the gas at the critical temperature. At temperatures and pressures below the critical levels, if one heats up a pure liquid compound, it reaches a definite boiling point. As more heat is supplied, the compound undergoes a readily apparent change of state from the liquid state to the gaseous state; its volume increases by as much as several thousand fold; and its density becomes very low. On the other hand, when a compound is maintained at a pressure above its critical pressure entirely different phenomena are observed as it is heated. As it reaches its critical temperature and then more heat is supplied, instead of boiling in the usual manner to produce an ordinary gaseous phase, it changes into a dense gas phase which is not sharply distinguishable from the liquid phase. As further heat is supplied above the critical temperature, the density of this dense gas phase gradually decreases to about 50% of that of the initial liquid phase, then 30%, and then perhaps as low as 10% or 5%, but it still exhibits a density much greater than the densities that ordinary gases exhibit under usual atmospheric conditions. In order to bring about this change from the liquid phase to the dense gas phase, a considerable input of heat is required. The amount of heat required to raise the temperature of the compound by 1° C. in this critical temperature region is much greater than that required to raise the temperature the same amount at other portions of the temperature scale. In other words, the compound exhibits a high heat capacity as it passes through its critical temperature, the pressure being above the critical pressure.

The critical temperatures and pressures of the compounds which are of concern in connection with the present invention are as follows:

| Compound | Critical Temperature, ° C. | Pressure, atm. |
| --- | --- | --- |
| Hydrogen chloride | 51 | 81.6 |
| Methyl chloride | 143 | 65.9 |
| Chlorine | 144 | 76.1 |
| Methylene chloride | 245 | 60.9 |
| Chloroform | 263 | 53.8 |
| Carbon tetrachloride | 283 | 45.0 |

When one gets away from the pure compounds, however, and starts dealing with the multi-component mixtures of the present invention, the critical temperatures and pressures of the pure compounds are not directly applicable. Instead, as a rough approximation, it is helpful to make use of the so-called pseudocritical temperatures and pseudocritical pressures of the mixtures. The pseudocritical temperature is the temperature arrived at by averaging the individual critical temperatures of the ingredients in proportion to the number of mols of each which are present. For example, the pseudocritical temperature of an equimolar mixture of methyl chloride plus methylene chloride would be:

$$[143° + 245°] \times \tfrac{1}{2} = 194° \text{ C.}$$

The same approach is used to arrive at the pseudocritical pressure for a given mixture. From a purely scientific viewpoint, these pseudocritical numbers are not precise physical properties of the mixture under consideration. One should instead refer to the critical condensation temperature ("cricondentherm") and the maximum pressure point of liquid vapor envelope ("cricondenbar") as set forth by B. F. Dodge, "Chemical Engineering Thermodynamics," McGraw-Hill Publishing Co., New York, 1944, page 545. These latter terms take into consideration, for example, the relatively small amount of a true vapor phase which may still exist above the pseudocritical pressure and at pressures up until one reaches the cricondenbar. In connection with the present invention, however, the pseudocritical numbers are sufficiently accurate for all practical purposes, and are the numbers referred to hereinafter when discussing critical temperatures or critical pressure as related to mixtures.

In carrying out the process of this invention, the pressure must be maintained in excess of about 65 atmospheres (absolute), which is approximately the critical pressure of the typical reaction mixture encountered. At pressures only slightly above 65 atmospheres, a small amount of an ordinary gas phase may still exist. Although the chlorine concentration may be somewhat higher in that phase than in other parts of the system, the amount thereof is not great enough to be hazardous. Preferably, the pressure is in the range of about 85 to 130 atmospheres, because no ordinary gas phase exists under those pressures. Pressures up to about 150 atmospheres or higher may be employed if desired, although they are not particularly advantageous.

The critical temperature depends upon the ingredients in the reaction mixture. In the case of starting mixtures which are rich in methyl chloride, the critical temperature is close to those of pure methyl chloride and chlorine, i.e., in the range of about 140° C. to about 160° C. In the case of starting mixtures which are rich in methylene chloride, the critical temperature, depending upon the amount of chlorine employed, may be in the general range of about 200° C. to about 240° C. Where substantial amounts, for example, about 30% by weight, of both methyl chloride and methylene chloride are present in the starting material, the critical temperature is in between the above ranges, i.e., about 160° C. to about 200° C.

The typical feed mixtures employed in this invention have heat capacities (for the gas at constant pressure) of about 10 to 15 P.C.U. (pound-centigrade units) per pound-mol per ° C., which is the same as 10 to 15 calories per gram-mol per ° C. In other words, at temperatures removed from the region of the critical temperature, it takes from 10 to 15 P.C.U. to raise the temperature of one pound-mol of the material by 1° C. In the region of the critical temperature, however, the reaction mixtures exhibit heat capacities which are markedly higher; for example, they exhibit heat capacities of from about 30 to 60 or 70 or more P.C.U./pound-mol/° C. The heat capacity of the various mixtures can be calculated by using the methods set forth in Hougen, Watson and Ragatz, "Chemical Process Principles," 2nd edition, John Wiley & Sons, New York, 1960, Part II; see in particular pages 593, 611 and 617.

These relatively high heat capacities, i.e., heat capacities above about 30 P.C.U./pound-mol ° C., are exhibited by the various reaction mixtures over temperatures ranging from about 10° C. up to about 50° C. away from the critical temperature. In the case of some of the reaction mixtures, the heat capacity is very high, but over only a relatively narrow range. In other cases, the heat capacity is only moderately high, but over a broader range. The highest heat capacity for a given reaction mixture tends to be exihibted somewhat above its critical temperature.

The process of the present invention involves pre-heating the feed mixture and then allowing the exothermic chlorination reaction to proceed substantially adiabatically under conditions such that the temperature of the reaction mixture increases to a maximum reaction temperature at least 20° C. beyond the pre-heat temperature but not higher than 450° C., and a part of this adiabatic temperature rise occurs within a temperature range in which the reaction mixture exhibits a heat capacity of at least 30 P.C.U./pound-mol/° C.

Pre-heating is needed in order to initiate the chlorination reaction within an economically reasonable length of time. The term "pre-heat temperature" as used herein means the actual temperature of the feed mixture at the point beyond which no further heat is introduced into the feed mixture from an external source. This point is usually the point where the feed mixture leaves the pre-heater. In some instances, however, the feed mixture may remain in the pre-heater zone for a somewhat longer period, with the result that the exothermic heat of reaction causes the temperature of the reacting mixture to rise above the temperature of the high-pressure steam or other heat exchange medium being used in the jacket. In such instances, the pre-heat temperature means the maximum temperature of the heat exchange material in the jacket. In instances where all the heat is supplied to the partially chlorinated methane starting material and/or the chlorine before they are mixed, the pre-heat temperature would be the temperature of the feed mixture immediately after mixing.

Pre-heat temperatures of about 120° C. to about 230° C. can be employed. At pre-heat temperatures below about 120° C. the reaction tends to get started too slowly to be economically attractive. At pre-heat temperatures above about 230° C., the temperature range within which the reaction mixture exhibits unusually high heat capacities has largely been passed and thus the opportunity for using the high heat capacity of the reaction mixture to prevent excessively high maximum reaction temperatures no longer exists. For this same reason, the pre-heat temperature should not go beyond the temperature range within which the reaction mixture exhibits a heat capacity of at least 30 P.C.U./pound-mol/° C.

Preferably, the pre-heat temperature should be from about 180° to about 230° C., especially when significant amounts of methylene chloride are present in the system because, at these higher pre-heat temperatures, the high heat capacity of the system can still be utilized while simultaneously obtaining the benefit of higher reaction speeds and thus shorter overall reaction times.

The reaction is carried out under substantially adiabatic conditions after the pre-heating has been completed. In other words, no special efforts are made either to introduce heat or to withdraw heat from the reacting ingredients. Preferably, the reactor is insulated so that the heat of reaction is retained, thereby causing completion of the reaction in a relatively short period of time, such as about one minute. The insulation also prevents undue dissemination of heat into the surrounding work area.

The temperature rise across the range of adiabatic reaction conditions should be at least 20°, but should not be such as to raise the maximum reaction temperature above 450° C. Unless the temperature rise is at least 20° C., the amount of chlorination is uneconomically low. Preferably, the temperature rise should be at least 100° C. and the maximum reaction temperature is in the range of about 300° C. to about 450° C. If the maximum reaction temperature exceeds about 450° C., it is likely that excessive amounts of undesired carbon tetrachloride will be formed, because the high temperatures favor the formation of the more highly chlorinated derivatives. Furthermore, at temperatures appreciably above 450° C., the danger of excessive carbonization and/or explosions increases markedly.

The principal features which determine the maximum reaction temperature attained are (a) the composition of the partially chlorinated methane starting material, (b) the mol ratio of chlorine to partially chlorinated methane, and (c) the pre-heat temperature. If a substantial amount of chloroform is present, this is not readily chlorinated, especially at the relatively lower temperatures; and if a significant amount of carbon tetrachloride is present, this is not subject to chlorination at all, and thus does not contribute to the heat load during the reaction. As the amount of chlorine is increased in the reaction mixture, the total amount of exothermic heat of reaction is increased. The higher the pre-heat temperature, the less heat capacity remains for absorbing the heat of reaction, and the higher the final temperature thus tends to be.

The relative rates of chlorination of the three partially chlorinated chloromethanes vary greatly, depending upon the prevailing temperature. In the temperature range of 150° C. to 250° C., the relative rates of chlorination of $CH_3Cl:CH_2Cl_2:CHCl_3$ are about 1.0:0.7:0.3. When the temperature is raised to the range of 400° C. to 500° C., however, the relative chlorination rates approach 1:1:1. In order to minimize the formation of the undesirable carbon tetrachloride, it is thus important that as much of the chlorination as possible take place at the relatively lower temperatures. In a typical prefered embodiment, as much as 50% of the total chlorine consumption takes place with a temperature rise of only about 50° C., because of the effect of the high heat capacity; and the remaining 50% of the chlorine consumption causes a temperature rise of perhaps 150° C., which leads to good clean-up of the chlorine, and a rapid overall reaction. Under these conditions, most of the reaction takes place at temperatures which favor the formation of the desired partially chlorinated methanes rather than the undesired carbon tetrachloride.

The reaction may be carried out batchwise or continuously, using various kinds of reactors, including stirred autoclaves, tubular reactors, and pipeline reactors. Solid packing materials and/or catalysts may or may not be used, as desired. Preferably, the reaction is carried out continuously in an unpacked pipeline reactor whose length is at least 125 times its inside circumference. Such a reactor is characterized by essentially plug-flow conditions at Reynolds numbers in excess of 5000, with the result that there is very little back mixing. The free chlorine is largely consumed by reacting with the methyl chloride and/or the methylene chloride. By the time the chloroform concentration becomes relatively high, the free chlorine has been largely used up. Hence, at no place in the reactor will there exist the combination of conditions that favor the undesired formation of carbon tetrachloride, these conditions being the sumultaneous occurrence of relatively high chloroform concentration plus relatively high chlorine concentration plus relatively high temperature.

Any material of construction may be employed that will withstand the pressures and the chemicals present. Preferred materials in the high temperature portion of the apparatus are the high nickel-containing alloys such as the Inconels and Hastelloys. These can be employed either as such, or as claddings on other metal substrates. Various mild steels or stainless steels can be employed in the low temperature portions of the apparatus.

Generally, the partially chlorinated methane starting material and the chlorine are separately pumped up to the desired pressure by two high pressure pumps and then mixed cold or at about room temperature. The resulting mixture is then passed through a heat exchanger, such as a jacketed pre-heater which contains high pressure steam in the jacket. Alternately, either the partially chlorinated methane starting material or the chlorine, or both, can be separately heated before mixing, in which case little or no additional heating may be required after mixing. When materials are being recycled, they may be recycled at an elevated temperature and/or at an elevated pressure.

The total reaction time, from the time the reactants leave the pre-heater until they leave the adiabatic porion of the reactor, is generally about ½ minute to 3 minutes, with reaction times of about 1–1½ minutes being most usual. At the end of these times, the chlorine content has usually been reduced almost to zero, especially if the maximum reaction temperature has been in the range of about 250° to 450° C.

The desired product or products can be recovered by known methods, which generally involve distillation. If the reaction is being operated continuously, the desired product or products plus the undesired products (chiefly hydrogen chloride and carbon tetrachloride) are continuously removed by distallation, preferably down to a level which is technically convenient, with the remainder of the materials being recycled.

The process of the present invention has numerous advantages. (A) By operating above the critical pressure and thereby preventing the presence of any substantial amount of normal vapor phase, one avoids the problem of having a localized high concentration of chlorine in the vapor phase, i.e., a concentration which is much higher than the chlorine concentration in the liquid phase and which is apt to be so high that explosive compositions may be formed. (B) By utilizing the high heat capacity of the reaction mixture, one avoids the necessity for using a large body of inert reaction medium (such as carbon tetrachloride) and the accompanying need to separate out and recycle such reaction medium. (C) By avoiding the inert reaction medium, one also greatly increases the effective available concentration of the partially chlorinated methane starting material, i.e., with more methyl chloride available to react, this is what the chlorine is most apt to find to react with, and the reaction rate is thus markedly better. (D) By carrying out most of the reaction at relativley low temperatures and by operating in such a manner that temperatures above about 450° C. are not encountered, the production of the desired partially chlorinated methanes is maximized and the production of the undesired carbon tetrachloride by-product is kept to the minimum. (E) The chlorine utilization is very good; in fact, it is essentially 100% when the maximum reaction temperature is in the range of about 250° to about 450° C. (F) There is no problem of having to provide a highly efficient heat exchange system in order to prevent runaway reactions which, in other processes, are apt to result from the high heat of reaction and/or from localized high concentrations of chlorine. (G) The process is very flexible, in the sense that one can produce methylene chloride and chloroform in almost any desired proportion, using exactly the same physical plant and equipment. (H) The reaction is very quick, requiring often less than one minute, yet it can be carried out in an essentially controlled and safe manner using relatively simple equipment. (I) Since the reaction products are already under high pressure, it is very convenient to carry out at least part of the subsequent distillation at elevated pressure, and this in turn greatly facilitates the separation of by-product hydrogen chloride from the methyl chloride which is to be recycled.

The following examples illustrate certain aspects of the invention. In carrying out these examples, one pump is used for the chlorine and a second pump is used for the mixture of the other ingredients, namely, methyl chloride ($CH_3Cl$), methylene chloride ($CH_2Cl_2$), chloroform ($CHCl_3$), carbon tetrachloride ($CCl_4$), and hydrogen chloride (HCl). The materials come from these pumps at the pressures indicated in the examples, i.e., pressures in excess of the critical pressures of the mixtures, which are about 65 atmospheres. These materials are mixed at the high pressures and fed into a pre-heater which consists of nickel tubing ⅜ inch in diameter by 55 feet long. This pre-heater is surrounded by a jacket which may contain high pressure steam or other suitable heat exchange material. The material leaving the pre-heater has been raised to the pre-heat temperature indicated in the following table. The pre-heated mixture then passes to a pipeline reactor made of annealed Inconel pipe which is ¾ inch in diameter by 100 feet long and is covered with pipe insulation having a diameter of 4 inches. In this reactor, maximum reaction temperatures are reached, as indicated in the various examples. At the end of the pipeline reactor, the reaction mixture passes through a pressure let-down valve, after which it is subjected to distallation in order to separate out the desired methylene chloride and/or chloroform products. Hydrogen chloride is separated out and sent to other processes for use. Excess amounts of carbon tetrachloride are also separated out. Methyl chloride, plus varying amounts of methylene chloride, chloroform, and carbon tetrachloride which have not been separated out, are recycled.

In the examples which are summarized in the following table, the pre-heat temperature in Example 1 is relatively low and the chlorine concentration is relatively low, with the result that the process produces somewhat more methylene chloride than chloroform. In Example 2, the temperature, the chlorine concentration, and the initial methylene chloride concentration are somewhat higher, with the result that a higher proportion of chloroform is produced. In Example 3, the initial methyl chloride concentration is high and the chlorine concentration is low, so that the conversion is primarily to methylene chloride. In Example 4, the initial methylene chloride concentration is high, and the pre-heat and maximum reaction temperatures are high, with the result that the conversion is predominantly to chloroform. In Example 5, the temperatures and the chlorine concentration are both relatively high, with the result that high conversions are obtained and the concentration of chloroform in the product is relatively high. In Example 6, the chlorine concentration and the temperatures are relatively high, with the result that high conversions of methyl chloride all the way to chloroform are obtained. In all these Examples, the amount of carbon tetrachloride produced is only about 2%–3% of the amount of chloroform produced.

TABLE

| Example No. | 1 | 2 | 3 | 4 | 5 | 6 |
|---|---|---|---|---|---|---|
| Feed Comp., Wt. Percent: | | | | | | |
| $CH_3Cl$ | 44.19 | 38.15 | 48.78 | 35.70 | 31.22 | 34.13 |
| $CH_2Cl_2$ | 41.38 | 47.48 | 32.64 | 49.96 | 43.72 | 41.21 |
| $CHCl_3$ | .22 | .12 | 7.51 | 2.70 | 5.57 | 4.92 |
| $CCl_4$ | .49 | .24 | .46 | .06 | .34 | .30 |
| $HCl$ | 0 | 0 | 2.27 | .63 | .12 | .15 |
| $Cl_2$ | 13.72 | 14.01 | 8.34 | 10.95 | 19.03 | 19.29 |
| Prod. Comp., Wt. Percent: | | | | | | |
| $CH_3Cl$ | 40.76 | 33.92 | 42.39 | 31.69 | 24.87 | 21.90 |
| $CH_2Cl_2$ | 47.29 | 52.89 | 40.86 | 52.12 | 48.36 | 51.40 |
| $CHCl_3$ | 4.23 | 5.52 | 9.67 | 9.72 | 16.30 | 15.99 |
| $CCl_4$ | .61 | 0.40 | .50 | .24 | .57 | .65 |
| $HCl$ | 7.04 | 7.19 | 6.52 | 6.23 | 9.90 | 10.06 |
| $Cl_2$ | .07 | .08 | 0.05 | 0 | 0 | 0 |
| Preheat Temp., °C | 148 | 150 | 163 | 221 | 205 | 211 |
| Pseudocritical Temp., °C | 175 | 181 | 169 | 184 | 183 | 180 |
| Max. Reaction Temp., °C | 195 | 198 | 191 | 343 | 372 | 400 |
| Reactor Pressure Atmospheres (absolute) | 96 | 96 | 98 | 96 | 89 | 89 |
| Partially Chlorinated Methane:Chlorine Mol Ratio | 7.1 | 6.7 | 12.0 | 8.6 | 4.4 | 4.4 |
| Production Ratio: | | | | | | |
| Lbs. $CHCl_3$/Lb. $CH_2Cl_2$ | .7 | 1.0 | .3 | 3.3 | 2.3 | 1.1 |
| Lbs. $CCl_4$/Lb. $CHCl_3$ | .03 | .03 | .02 | .03 | .02 | .03 |

What is claimed is:

1. A partial chlorination process which comprises providing a feed mixture which initially consists essentially of chlorine plus a partially chlorinated methane starting material selected from the group consisting of methyl chloride, methylene chloride and combinations thereof, the mol ratio of chlorine to partially chlorinated methane in said mixture being in the range of about 1:3 to about 1:12, the pressure on said mixture being at least 65 atmospheres, and the pre-heat temperature of said mixture being in the range of about 120° C. to about 230° C. but not beyond the temperature range within which the reaction mixture exhibits a heat capacity of at least 30 pound-centrigrade units per pound-mol per °C.; causing the chlorination reaction to proceed under substantially adiabatic conditions and at a pressure of at least 65 atmospheres; the combination of (a) the composition of the partially chlorinated methane starting material, plus (b) the mol ratio of chlorine to partially chlorinated methane, plus (c) the pre-heat temperature being such that the exothermic heat of reaction causes the temperature to rise adiabatically at least 20° C. and through a temperature range in which the mixture exhibits a heat capacity of at least 30 pound-centrigrade units per pound-mol per °C., and up to a maximum reaction temperature which is not higher than about 450° C., at which maximum temperature essentially all of the chlorine has been reacted; and thereupon separating out a partially chlorinated methane product which contains a higher proportion of chlorine than the partially chlorinated methane starting material and which is selected from the group consisting of methylene chloride, chloroform and combinations thereof.

2. A process according to claim 1 in which the starting material contains at least 30% by weight of methyl chloride, at least 30% by weight of methylene chloride, and no more than 10% by weight of chloroform.

3. A process according to claim 1 in which the mol ratio of chlorine to partially chlorinated methanes is in the range of about 1:4 to about 1:7.

4. A process according to claim 1 in which the pressure on the feed mixture and during the chlorination reaction is in the arnge of about 85 atmospheres to about 130 atmospheres.

5. A process according to claim 1 in which the pre-heat temperature is in the range of about 180° C. to about 230° C.

6. A process according to claim 1 in which the reaction is carried out in a pipeline reactor.

7. A process according to claim 1 in which the maximum reaction temperature is in the range of about 300° C. to about 450° C.

8. A process according to claim 1 in which both methylene chloride and chloroform are separated out as the principal products.

9. A process according to claim 1 in which at least one partially chlorinated methane that is present in the reaction mixture is recycled to the feed mitxure.

10. A partial clorination process which comprises providing a feed mixture which initially consists essentially of chlorine plus a partially chlorinated methane starting material, said starting material consisting essentially of at least 30% by weight of methyl chloride, at least 30% by weight of methylene chloride, and no more than 10% by weight of chloroform, the mol ratio of chlorine to partially chlorinated methanes in said mixture being in the range fo about 1:4 to about 1:7, the pressure on said mixture being in the range of about 85 atmospheres to about 130 atmospheres, and the pre-heat temperature of said mixture being in the range of about 180° C. to about 230° C.; introducing said mixture into a pipeline reactor in which the pressure is maintained in the range of about 85 atmospheres to 130 atmospheres and in which the chlorination reaction is allowed to proceed under substantially adiabatic conditions; the combination of (a) the composition of the partially chlorinated methane starting material, plus (b) the mol ratio of chlorine to partially chlorinated methane, plus (c) the pre-heat temperature being such that the exothermic heat of reaction causes the temperature to rise adiabatically at least 100° C. and through a temperature range in which the mixture exhibits a heat capacity of at least 30 pound-centrigrade units per pound-mol per °C. and up to a maximum reaction temperature in the range of about 300° C. to about 450° C., at which maximum reaction temperature essentially all of the chlorine has been reacted; thereupon separating out a partially chlorinated methane product selected from the group consisting of methylene chloride, chloroform and combinations thereof; and recycling to the feed mixture partially chlorinated methanes not thus removed from the system.

References Cited

UNITED STATES PATENTS

| | | | |
|---|---|---|---|
| 1,939,292 | 12/1933 | Carlisle | 260—658 |
| 1,975,727 | 10/1934 | Levine | 260—658 |
| 2,105,733 | 1/1938 | Hass et al. | 260—658 X |
| 2,406,195 | 8/1946 | Cass | 260—658 X |
| 3,126,419 | 3/1964 | Burks et al. | 260—664 X |

FOREIGN PATENTS

| | | |
|---|---|---|
| 283,119 | 5/1928 | Great Britain. |
| 32,817 | 7/1965 | Germany. |

LEON ZITVER, Primary Examiner

JOSEPH BOSKA, Assistant Examiner